(12) United States Patent
Norrell et al.

(10) Patent No.: US 8,194,722 B2
(45) Date of Patent: Jun. 5, 2012

(54) VARIOUS METHODS AND APPARATUSES FOR IMPULSE NOISE MITIGATION

(75) Inventors: Andrew L. Norrell, Nevada City, CA (US); Hossein Sedarat, San Jose, CA (US); Kevin D. Fisher, Palo Alto, CA (US); Douglas J. Artman, San Jose, CA (US); James T. Schley-May, Nevada City, CA (US); Brian Wiese, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1028 days.

(21) Appl. No.: 11/248,704

(22) Filed: Oct. 11, 2005

(65) Prior Publication Data

US 2006/0078044 A1 Apr. 13, 2006

Related U.S. Application Data

(60) Provisional application No. 60/618,001, filed on Oct. 11, 2004.

(51) Int. Cl.
*H04B 1/38* (2006.01)
(52) U.S. Cl. ........ 375/222; 375/219; 375/220; 375/223; 375/295; 375/316
(58) Field of Classification Search .......... 375/135–136, 375/146–147, 213, 219, 221–222, 225, 254, 375/259, 316, 342, 220, 295, 299
See application file for complete search history.

(56) References Cited

U.S. PATENT DOCUMENTS

| | | | |
|---|---|---|---|
| 4,009,371 A | 2/1977 | Hamilton et al. | |
| 4,024,359 A | 5/1977 | DeMarco et al. | |
| 4,024,360 A | 5/1977 | Biraghi et al. | |
| 4,173,714 A | 11/1979 | Bloch et al. | |
| 4,384,355 A | 5/1983 | Werner | |
| 4,679,227 A | 7/1987 | Hughes-Hartogs | |
| 4,733,389 A | 3/1988 | Puvogel | |
| 4,845,466 A | 7/1989 | Hariton et al. | |
| 4,882,733 A | 11/1989 | Tanner | |
| 4,977,591 A | 12/1990 | Chen et al. | |
| 5,285,474 A | 2/1994 | Chow et al. | |

(Continued)

FOREIGN PATENT DOCUMENTS

EP 0 377 965 A2 7/1989

(Continued)

OTHER PUBLICATIONS

Yusaku Okamura et al., "ADSL System for Time Periodic Noise Environments", XP-000869790, NEC Res. & Develop., vol. 40, No. 1, Jan. 1999, pp. 64-69.

Thomas Starr, John M. Cioffi, Peter J. Silverman, Understanding Digital Subscriber Line Technology, 1999, pp. 94-97, 147-154, 206-217, 241-251, 330-331, Cover Page, Publication Page, Table of Contents. Prentice Hall PTR Upper Saddle River, NJ, 07458.

(Continued)

*Primary Examiner* — Hirdepal Singh
(74) *Attorney, Agent, or Firm* — Sterne, Kessler, Goldstein & Fox PLLC

(57) ABSTRACT

Methods and apparatuses for reducing effects of impulse noise in a DSL transmitter receiver device are described. According to certain embodiment, the method includes using a periodicity associated with the impulse noise affecting a DSL transmitter receiver device to determine data frames that are affected by the impulse noise, and sending a reduced data rate during those frames. In certain embodiments, no data is sent during those frames. The method further includes using a high margin bits and gain table, instead of a normal bits and gain table.

20 Claims, 5 Drawing Sheets

U.S. PATENT DOCUMENTS

| | | |
|---|---|---|
| 5,304,940 A | 4/1994 | Harasawa et al. |
| 5,479,447 A | 12/1995 | Chow et al. |
| 5,483,551 A | 1/1996 | Huang et al. |
| 5,524,125 A | 6/1996 | Tsujimoto |
| 5,555,274 A | 9/1996 | Sheets |
| 5,559,890 A | 9/1996 | Obermeier et al. |
| 5,596,258 A | 1/1997 | Kimura et al. |
| 5,596,439 A | 1/1997 | Dankberg et al. |
| 5,627,859 A | 5/1997 | Parr |
| 5,703,904 A | 12/1997 | Langberg |
| 5,768,473 A | 6/1998 | Eatwell et al. |
| 5,790,550 A | 8/1998 | Peeters et al. |
| 5,815,538 A | 9/1998 | Grell et al. |
| 5,818,872 A | 10/1998 | Gupta |
| 5,844,940 A | 12/1998 | Goodson et al. |
| 5,852,630 A | 12/1998 | Langberg et al. |
| 5,867,539 A | 2/1999 | Koslov |
| 5,901,205 A | 5/1999 | Smith et al. |
| 5,909,178 A | 6/1999 | Balch et al. |
| 5,930,268 A | 7/1999 | Kurby et al. |
| 5,952,914 A | 9/1999 | Wynn |
| 5,974,098 A | 10/1999 | Tsuda |
| 5,978,373 A | 11/1999 | Hoff et al. |
| 5,978,760 A | 11/1999 | Rao et al. |
| 6,006,083 A | 12/1999 | Tong et al. |
| 6,014,376 A | 1/2000 | Abreu et al. |
| 6,052,420 A | 4/2000 | Yeap et al. |
| 6,118,769 A | 9/2000 | Pries et al. |
| 6,147,963 A | 11/2000 | Walker et al. |
| 6,161,209 A | 12/2000 | Moher |
| 6,185,429 B1 | 2/2001 | Gehrke et al. |
| 6,205,220 B1 | 3/2001 | Jacobsen et al. |
| 6,205,410 B1 | 3/2001 | Cai |
| 6,212,227 B1 | 4/2001 | Ko et al. |
| 6,226,322 B1 | 5/2001 | Mukherjee |
| 6,256,326 B1 | 7/2001 | Kudo |
| 6,266,347 B1 | 7/2001 | Amrany et al. |
| 6,266,422 B1 | 7/2001 | Ikeda |
| 6,295,323 B1 | 9/2001 | Gabara |
| 6,330,275 B1 | 12/2001 | Bremer |
| 6,345,071 B1 | 2/2002 | Hamdi |
| 6,351,509 B1 | 2/2002 | Vitenberg et al. |
| 6,359,926 B1 | 3/2002 | Isaksson et al. |
| 6,363,109 B1 | 3/2002 | Polley et al. |
| 6,378,234 B1 | 4/2002 | Luo |
| 6,396,827 B1 | 5/2002 | Paivike et al. |
| 6,411,657 B1 | 6/2002 | Verbin et al. |
| 6,433,819 B1 | 8/2002 | Li et al. |
| 6,445,773 B1 | 9/2002 | Liang et al. |
| 6,456,673 B1 | 9/2002 | Wiese et al. |
| 6,459,739 B1 | 10/2002 | Vitenberg |
| 6,466,588 B1 | 10/2002 | Michaels |
| 6,493,395 B1 | 12/2002 | Isaksson et al. |
| 6,498,808 B1 | 12/2002 | Tzannes |
| 6,507,608 B1 | 1/2003 | Norrell |
| 6,519,291 B1 | 2/2003 | Dagdeviren et al. |
| 6,542,028 B1 | 4/2003 | Norrell et al. |
| 6,546,025 B1 | 4/2003 | Dupuy |
| 6,556,635 B1 | 4/2003 | Dehghan |
| 6,597,732 B1 | 7/2003 | Dowling |
| 6,621,346 B1 | 9/2003 | Nabicht et al. |
| 6,631,175 B2 | 10/2003 | Harikumar et al. |
| 6,633,545 B1 | 10/2003 | Milbrandt |
| 6,647,070 B1 | 11/2003 | Shalvi et al. |
| 6,674,795 B1 | 1/2004 | Liu et al. |
| 6,690,666 B1 | 2/2004 | Norrell et al. |
| 6,721,394 B1 | 4/2004 | Murphy et al. |
| 6,731,914 B2 | 5/2004 | Creigh et al. |
| 6,738,418 B1 | 5/2004 | Stiscia et al. |
| 6,754,170 B1 | 6/2004 | Ward |
| 6,763,061 B1 | 7/2004 | Strait et al. |
| 6,775,241 B1 | 8/2004 | Levin |
| 6,791,995 B1 | 9/2004 | Azenkot et al. |
| 6,798,735 B1 | 9/2004 | Tzannes et al. |
| 6,822,998 B1 | 11/2004 | Yun et al. |
| 6,826,404 B2 | 11/2004 | Delfs et al. |
| 6,839,429 B1 | 1/2005 | Gaikwad et al. |
| 6,859,488 B2 | 2/2005 | Azenkot et al. |
| 6,871,066 B1 | 3/2005 | Khullar et al. |
| 6,888,497 B2 | 5/2005 | King et al. |
| 6,898,236 B1 | 5/2005 | Sun |
| 6,934,345 B2 | 8/2005 | Chu et al. |
| 6,940,973 B1 | 9/2005 | Yeap et al. |
| 6,965,636 B1 | 11/2005 | DesJardins et al. |
| 6,999,504 B1 | 2/2006 | Amrany et al. |
| 6,999,507 B2 | 2/2006 | Jin |
| 7,023,910 B1 | 4/2006 | Norrell |
| 7,031,669 B2 | 4/2006 | Vaidyanathan et al. |
| 7,035,661 B1 | 4/2006 | Yun |
| 7,085,315 B1 | 8/2006 | Kelton |
| 7,085,539 B2 | 8/2006 | Furman |
| 7,120,211 B2 | 10/2006 | Shmulyian et al. |
| 7,155,007 B1 | 12/2006 | Upton |
| 7,174,022 B1 | 2/2007 | Zhang et al. |
| 7,177,419 B2 | 2/2007 | Sedarat et al. |
| 7,184,467 B2 | 2/2007 | Jacobsen et al. |
| 7,200,196 B2 | 4/2007 | Li et al. |
| 7,215,727 B2 | 5/2007 | Yousef et al. |
| 7,221,722 B2 | 5/2007 | Thomas et al. |
| 7,240,252 B1 | 7/2007 | Fessler et al. |
| 7,260,117 B2 | 8/2007 | Long et al. |
| 7,283,509 B2 | 10/2007 | Moon et al. |
| 7,283,598 B2 | 10/2007 | Akita et al. |
| 7,302,379 B2 * | 11/2007 | Cioffi et al. ..................... 703/20 |
| 7,315,592 B2 | 1/2008 | Tsatsanis et al. |
| 7,315,967 B2 | 1/2008 | Azenko et al. |
| 7,330,544 B2 | 2/2008 | D'Angelo et al. |
| 7,356,049 B1 | 4/2008 | Rezvani |
| 7,366,258 B2 | 4/2008 | Kolze et al. |
| 7,369,607 B2 | 5/2008 | Sedarat |
| 7,421,015 B2 | 9/2008 | Sedarat |
| 7,433,395 B2 | 10/2008 | Sedarat |
| 7,443,916 B2 | 10/2008 | Sedarat et al. |
| 7,502,336 B2 | 3/2009 | Romano et al. |
| 7,529,984 B2 | 5/2009 | Heise |
| 7,555,037 B2 | 6/2009 | Sedarat |
| 7,630,489 B2 | 12/2009 | Oksman et al. |
| 7,773,666 B2 * | 8/2010 | Belge et al. ................... 375/222 |
| 7,813,439 B2 | 10/2010 | Norrell et al. |
| 7,822,005 B2 * | 10/2010 | Ptasinski et al. ............. 370/338 |
| 7,852,950 B2 | 12/2010 | Sedarat |
| 7,953,163 B2 | 5/2011 | Wiese |
| 2001/0009850 A1 | 7/2001 | Kushige |
| 2001/0011019 A1 | 8/2001 | Jokimies |
| 2001/0055332 A1 | 12/2001 | Sadjadpour et al. |
| 2002/0001340 A1 | 1/2002 | Shenoi et al. |
| 2002/0044597 A1 | 4/2002 | Shively et al. |
| 2002/0057713 A1 | 5/2002 | Bagchi et al. |
| 2002/0078247 A1 | 6/2002 | Lu et al. |
| 2002/0080862 A1 | 6/2002 | Ali |
| 2002/0122515 A1 | 9/2002 | Bodenschatz |
| 2002/0154620 A1 | 10/2002 | Azenkot et al. |
| 2002/0163959 A1 | 11/2002 | Haddad |
| 2003/0021240 A1 | 1/2003 | Moon et al. |
| 2003/0035469 A1 | 2/2003 | Frank et al. |
| 2003/0043925 A1 | 3/2003 | Stopler et al. |
| 2003/0048368 A1 | 3/2003 | Bosco et al. |
| 2003/0055996 A1 | 3/2003 | Mori et al. |
| 2003/0091053 A1 | 5/2003 | Tzannes et al. |
| 2003/0099285 A1 | 5/2003 | Graziano et al. |
| 2003/0099286 A1 | 5/2003 | Graziano et al. |
| 2003/0099350 A1 | 5/2003 | Bostoen et al. |
| 2003/0108094 A1 | 6/2003 | Lai et al. |
| 2003/0112860 A1 | 6/2003 | Erdogan |
| 2003/0112887 A1 | 6/2003 | Sang et al. |
| 2003/0124983 A1 | 7/2003 | Parssinen et al. |
| 2003/0185176 A1 | 10/2003 | Lusky et al. |
| 2003/0206579 A1 | 11/2003 | Bryant |
| 2003/0227967 A1 | 12/2003 | Wang et al. |
| 2004/0057502 A1 | 3/2004 | Azenkot et al. |
| 2004/0066865 A1 | 4/2004 | Yousef et al. |
| 2004/0071240 A1 | 4/2004 | Betts |
| 2004/0085987 A1 * | 5/2004 | Gross et al. ................... 370/430 |
| 2004/0087278 A1 | 5/2004 | Lin et al. |
| 2004/0091025 A1 | 5/2004 | Sindhushayana et al. |
| 2004/0111345 A1 | 6/2004 | Chuang et al. |
| 2004/0125015 A1 | 7/2004 | King et al. |

| | | | |
|---|---|---|---|
| 2004/0141548 | A1 | 7/2004 | Shattil |
| 2004/0156441 | A1 | 8/2004 | Peeters et al. |
| 2004/0176063 | A1 | 9/2004 | Choi |
| 2004/0185852 | A1 | 9/2004 | Son et al. |
| 2004/0213170 | A1 | 10/2004 | Bremer |
| 2004/0223449 | A1 | 11/2004 | Tsuie et al. |
| 2005/0041753 | A1 | 2/2005 | Cunningham |
| 2005/0047489 | A1 | 3/2005 | Yousef et al. |
| 2005/0047514 | A1 | 3/2005 | Bolinth et al. |
| 2005/0053229 | A1 | 3/2005 | Tsatsanis et al. |
| 2005/0094550 | A1 | 5/2005 | Huh et al. |
| 2005/0099967 | A1 | 5/2005 | Baba |
| 2005/0111561 | A1 | 5/2005 | Sedarat et al. |
| 2005/0143008 | A1* | 6/2005 | Bailey .......................... 455/63.1 |
| 2005/0159128 | A1 | 7/2005 | Collins et al. |
| 2005/0169357 | A1 | 8/2005 | Sedarat |
| 2005/0190825 | A1 | 9/2005 | Sedarat |
| 2005/0190848 | A1 | 9/2005 | Kiyanagii et al. |
| 2005/0190871 | A1 | 9/2005 | Sedarat |
| 2005/0216441 | A1 | 9/2005 | Thomas et al. |
| 2005/0271129 | A1* | 12/2005 | Reina ............................ 375/222 |
| 2005/0276355 | A1 | 12/2005 | Chow et al. |
| 2006/0002457 | A1 | 1/2006 | Romano et al. |
| 2006/0019687 | A1 | 1/2006 | Garg et al. |
| 2006/0039550 | A1* | 2/2006 | Chadha et al. ............ 379/406.09 |
| 2006/0056305 | A1* | 3/2006 | Oksman et al. ................ 370/252 |
| 2006/0062379 | A1 | 3/2006 | Sedarat et al. |
| 2006/0067388 | A1 | 3/2006 | Sedarat et al. |
| 2006/0083321 | A1 | 4/2006 | Sedarat |
| 2006/0083322 | A1 | 4/2006 | DesJardins et al. |
| 2006/0083323 | A1 | 4/2006 | DesJardins et al. |
| 2006/0083324 | A1 | 4/2006 | DesJardins et al. |
| 2006/0115030 | A1 | 6/2006 | Erving et al. |
| 2006/0126747 | A1 | 6/2006 | Wiese |
| 2006/0171480 | A1 | 8/2006 | Erving et al. |
| 2006/0193390 | A1 | 8/2006 | Sedarat |
| 2006/0203843 | A1* | 9/2006 | Liu ................................ 370/465 |
| 2006/0222098 | A1 | 10/2006 | Sedarat et al. |
| 2006/0227913 | A1 | 10/2006 | Sedarat |
| 2006/0253515 | A1 | 11/2006 | Sedarat |
| 2006/0291537 | A1 | 12/2006 | Fullerton et al. |
| 2007/0002940 | A1 | 1/2007 | Zhou |
| 2007/0183526 | A1 | 8/2007 | Norrell et al. |
| 2007/0217492 | A1 | 9/2007 | Cox et al. |
| 2008/0232444 | A1* | 9/2008 | Tzannes ........................ 375/219 |
| 2008/0317110 | A1 | 12/2008 | Sedarat |
| 2010/0091827 | A1 | 4/2010 | Wiese et al. |
| 2011/0206104 | A1 | 8/2011 | Wiese et al. |

FOREIGN PATENT DOCUMENTS

| | | |
|---|---|---|
| EP | 0 844 758 A2 | 5/1998 |
| EP | 0966134 A2 | 12/1999 |
| EP | 1 389 846 A2 | 2/2004 |
| EP | 1 388 944 A1 | 4/2004 |
| WO | WO 2006/042274 A1 | 4/2006 |
| WO | WO 2010/042350 | 4/2010 |

OTHER PUBLICATIONS

Ahmed, Nadeem, et al., "Optimal Transmit Spectra for Communication in the Presence of Crosstalk and Imperfect Echo Cancellation," IEEE, p. 17-21, © 2001.
Al-Dhahir, Naofal, et al., "Optimum Finite-Length Equalization for Multicarrier Transceivers," IEEE vol. 44, No. 1, p. 56-64, Jan. 1996.
Armada, Ana Garcia, et al., "Mulit-User Constant-Energy Bit Loading for M-PSK-Modulated Orthogonal Frequency Division Multiplexing," IEEE, p. 526-530, © 2002.
Arslan, G., et al., "Equalization for Discrete Multitone Transceivers to Maximize Bit Rate," IEEE, vol. 49, No. 12, p. 3123-3135, Dec. 2001.
Baccarelli, Enzo, et al., Novel Efficient Bit-Loading Algorithms for Peak-Energy Limited ADSL-Type Multicarrier Systems, IEEE Trans on Signal Processing, vol. 50, No. 5, May 2002.
Barreto, Andre Noll, et al., "Adaptive Bit Loading for Wireless OFDM Systems," IEEE International Symposium on Personal, Indoor, and Mobile Radio Communications, Oct. 2001.
Bingham, John A.C., et al., "Multicarrier Modulation for Data Transmission: An Idea Whose Time Has Come," IEEE, p. 5-14, May 1990.
Blahut, Richard E., "Theory and Practice of Error Control Codes," Chapter 7: Bose-Chaudhuri-Hocquenghem Codes, 1984.
Blahut, Richard E., "Theory and Practice of Error Control Codes," Chapter 11: Fast Algorithms, 1984.
Campello, Jorge, "Optimal Discrete Bit Loading for Multicarrier Modulation Systems," IEEE International Symposium on Information Theory, Cambridge, MA, Aug. 1998.
Chow, Peter S., et al., "A Practical Discrete Multitone Transceiver Loading Algorithm for Data Transmission Over Spectrally Shaped Channels," IEEE Trans. On Communications, vol. 43, No. 2, 1995.
Cioffi, J. et al., "Analog RF Cancelation with SDMT (96-084)," T1E1.4/96-084 contribution, Amati Communications Corporation, Apr. 22, 1996.
Cioffi, J.M. et al., "Generalized Decision-Feedback Equalization for Packet Transmission with ISI and Gaussian Noise," In Communications, Computation, Control, and Signal Processing, a tribute to Thomas Kailath, Kluwer Academic Publishers, p. 79-127, 1997.
"Draft Standard," Network and Customer Installation Interfaces-Asymmetric Digital Subscriber Line (ADSL) Metallic Interface, Draft American National Standard for Telecommunications, Alliance for Telecommunications Industry Solutions, T1, 413, 1998.
Farhang-Boroujeny, Behrouz, et al., "Design Methods for Time-Domain Equalizers in DMT Transceivers," IEEE, vol. 49, No. 3, p. 554-562, Mar. 2001.
Fischer, Robert F.H., et al., "A New Loading Algorithm for Discrete Multitone Transmission," IEEE, p. 724-728, 1996.
Franklin, Curt, "How DSL Works," How Stuff Works, http://computer.howstuffworks.com/dsl.htm/printable, printed Nov. 16, 2004.
Henkel, Werner, et al., "Maximizing the Channel Capacity of Multicarrier Transmission by Suitable Adaptation of the Time-Domain Equalizer," IEEE, vol. 48, No. 12, Dec. 2000.
International Preliminary Report on Patentability, PCT/US2005/023634 filed Jun. 30, 2005, mailed Jan. 18, 2007.
International Preliminary Report on Patentability (Chapter 1), International Application No. PCT/US2005/036655, filed Oct. 11, 2005, mailed Apr. 11, 2007.
International Preliminary Report on Patentability, International Application No. PCT/US2007/001997, filed Jan. 25, 2007, mailed Aug. 21, 2008.
International Telecommunication Union (ITU) Recommendation G.992.1, "Asymmetric digital subscriber line (ADSL) transceivers," Series G: Transmission Systems and Media, Digital Systems and Networks, Jun. 1999.
International Telecommunication Union (ITU) Recommendation G.992.3, "Asymmetric digital subscriber line transceivers -2 (ASDL 2), Series G: Transmission Systems and Media, Digital Systems and Networks," Jul. 2002.
International Telecommunication Union (ITU) Recommendation G.993.1, "Very high speed digital subscriber line (VDSL)," Series G: Transmission Systems and Media, Digital Systems and Networks, Jun. 2004.
International Telecommunication Union (ITU) Recommendation G.992.2, "Splitterless asymmetric digital subscriber line (ADSL) transceivers," Series G: Transmission Systems and Media, Digital Systems and Networks, Jun. 1999.
Kamkar-Parsi et al., Wideband Crosstalk Interface Cancelling on xDSL Using Adaptive Signal Processing and Common Mode Signal, IEEE, p. IV-1045-IV-1048, 2004.
Karp et al., Zero-forcing frequency domain equalization for DMT systems with insufficient guard interval, IEEE ICASSP, p. 221-224, 2003.
Krongold, Brian S., et al., "Computationally Efficient Optimal Power Allocation Algorithms for Multicarrier Communications Systems," IEEE Trans. On Communications, vol. 48, p. 23-27, Jan. 2000.
Lampe, Lutz H.J., et al., "Performance Evaluation of Non-Coherent Transmission Over Power Lines," 8 pages, 2007.
Lashkarian, Navid, et al., Fast Algorithm for Finite-Length MMSE Equalizers with Application to Discrete Multitone Systems, IEEE, p. 2753-2756, 1999.
Leke, Achankeng et al., "A Maximum Rate Loading Algorithm for Discrete Multitone Modulation Systems," IEEE, p. 1514-1518, 1997.

Magesacher, Thomas et al., "Adaptive Interference Cancellation Using Common-Mode Information in DSL," Proceedings of European Signal Processing Conference 2005, Sep. 2005.

Magesacher, Thomas et al., "Analysis of Adaptive Interference Cancellation Using Common-Mode Information in Wireline Communications," EURSASIO Journal on Advances in Signal Processing, vol. 2007, Article 84956, Jun. 2007.

Magesacher, Thomas et al., "Information Rate Bounds in Common-Mode Aided Wireline Communications," European Transactions on Telecommunications, vol. 17, No. 5, p. 533-545, Oct. 2006.

Melsa, Peter J.W., et al., "Impulse Response Shortening for Discrete Multitone Transceivers," IEEE vol. 44, No. 12, p. 1662-1672, Dec. 1996.

Milosevic et al., "Simultaneous Multichannel Time Domain Equalizer Design Based on the Maximum Composite Shortening SNR," Dept. of Electrical and Compter Eng., The University of Texas, Austin, Texas, 5 pages, 2002.

Misao, Fukuda et all, "A Line Terminating LSI Using Echo Cancelling Method for ISDN Subscriber Loop Transmission," IEEE Journal on Selected Areas in Communications, vol. 6, No. 3, p. 476-483, Apr. 1988.

PCT Search Report and Written Opinion of the International Searching Authority, International Application No. PCT/US2005/036655, International filed Oct. 11, 2005, mailed Feb. 14, 2006.

PCT Search Report and Written Opinion of the International Searching Authority, International Application No. PCT/US06/09687, International Filing Date Mar. 16, 2006, Mailed Nov. 16, 2007.

PCT Search Report and Written Opinion of the International Searching Authority, International Application No. PCT/US06/10004, International Filing Date Mar. 16, 2006, Mailed Oct. 10, 2007.

PCT Search Report and Written Opinion of the International Searching Authority, International Application No. PCT/US06/09804, Filing Date Mar. 17, 2006, Mailed Apr. 2, 2008.

PCT Search Report and Written Opinion of the International Searching Authority, International Application No. PCT/US09/58821, Filing Date Sep. 29, 2009, Mailed Dec. 2, 2009.

Perez-Alvarez, Ivan A., et al., "A Differential Error Reference Adaptive Echo Canceller for Multilevel PAM Line Codes," Work supported by National Project T1C95-0026, IEEE, p. 1707-1710, © 1996.

Sedarat, Hossein, et al., "Impulse Noise Protection for Multi-Carrier Communication Systems," submitted to IEEE ICASSP, 2005.

Sedarat, Hossein, et al., "Multicarrier Bit-Loading in Presence of Biased Gaussian Noise Sources," IEEE Consumer Communication and Networking Conference, Jan. 2005.

Sonalkar, Ranjan, et al., "An Efficient Bit-Loading Algorithm for DMT Application," IEEE Comm. Letters, vol. 4, p. 80-82, Mar. 2000.

Sonalkar, Ranjan, et al., "Shannon Capacity of Frequency-Overlapped Digital Subscriber Loop Channels," IEEE, p. 1741-1745, © 2002.

STLC60134S: TOSCA Integrated ADSL. CMOS Analog Front-End Circuit, Aug. 1999.

Toumpakaris, D. "A byte-erasure method for improved impulse immunity in DSL systems using soft information from an inner code," IEEE International Conference on Communications (ICC), vol. 4, p. 2431-2435, May 2003.

Toumpakaris, D., "A Square Distance-Based Byte-Erasure Method for Reduced-delay Protection of DSL Systems from Non-stationary Interference," IEEE International Conference on Communications (ICC), vol. 4, p. 2114-2119, San Francisco, CA, Dec. 2003.

Toumpakaris, D., "Reduced Delay Protection of DSL Systems Against Nonstationary Disturbances," IEEE Trans. Communications, vol. 52, No. 11, Nov. 2004.

Wu, Cheng-Shing, et al., "A Novel Cost-Effective Multi-Path Adaptive Interpolated FIR (IFIR)-Based Echo Canceller," IEEE, p. V-453-V-456, © 2000.

Wyglinski, Alexander M., et al., "An Efficient Bit Allocation for Multicarrier Modulation," IEEE Wireless Communication, Networking Conference, Atlanta, GA, 4 pages, Mar. 2004.

Zogakis, T.N., et al., "Impulse Noise Mitigation Strategies for Multicarrier Modulation," Proceedings of the International Conference on Communications (ICC), vol. 3, p. 784-788, May 23, 1993.

Non-Final Office Action dated Oct. 30, 2007, U.S. Appl. No. 11/067,434, filed Feb. 25, 2005, Sedarat.

Final Office Action dated Apr. 29, 2008, U.S. App. No. 11/067,434, filed Feb. 25, 2005, Sedarat.

Non-Final Office Action dated Jul. 21, 2008, U.S. Appl. No. 11/067,434, filed Feb. 25, 2005, Sedarat.

Non-Final Office Action dated Jan. 6, 2009, U.S. Appl. No. 11/067,434, filed Feb. 25, 2005, Sedarat.

Non-Final Office Action dated Aug. 19, 2009, U.S. Appl. No. 11/067,434, filed Feb. 25, 2005, Sedarat.

Non-Final Office Action dated May 16, 2008, U.S. Appl. No. 11/131,392, filed May 16, 2005, Wiese.

Non-Final Office Action dated Dec. 10, 2008, U.S. Appl. No. 11/131,392, filed May 16, 2005, Wiese.

Non-Final Office Action dated Jun. 9, 2009, U.S. Appl.No. 11/131,392, filed May 16, 2005, Wiese.

Non-Final Office Action dated Nov. 26, 2008, U.S. Appl.No. 11/348,733, filed Feb. 6, 2006, Norrell et al.

Non-Final Office Action dated Apr. 8, 2009, U.S. Appl. No. 11/348,733, filed Feb. 6, 2006, Norrell et al.

Non-Final Office Action dated Oct. 23, 2009, U.S. Appl. No. 11/348,733, filed Feb. 6, 2006, Norrell et al.

Non-Final Office Action dated Feb. 24, 2009, U.S. Appl. No. 11/377,114, filed Mar. 15, 2006, Sedarat.

Final Office Action dated Jul. 31, 2009, U.S. Appl. No. 11/377,114, filed Mar. 15, 2006, Sedarat.

Non-Final Office Action dated Nov. 9, 2007, U.S. Appl. No. 11/377/083, filed Mar. 15, 2006, Sedarat.

Non-Final Office Action dated May 19,2008, U.S. Appl. No. 11/377/083, filed Mar. 15, 2006, Sedarat.

Notice of Allowance dated May 18, 2009, U.S. Appl. No. 11/377/083, filed Mar. 15, 2006, Sedarat.

Final Office Action dated Dec. 4, 2008, U.S. Appl. No. 11/377/083, filed Mar. 15, 2006, Sedarat.

Non-Final Office Action dated Dec. 11, 2008, U.S. Appl. No. 11/377,084, filed Mar. 15, 2006, Sedarat et al.

Non-Final Office Action dated Aug. 4, 2009, U.S. Appl. No. 11/377,084, filed Mar. 15, 2006, Sedarat et al.

Magesacher T. et al, "On the Capacity of the Copper Cable Channel Using the Common Mode", Proc. of the Global Telecomniunications Conference, Taipei, Taiwan, Nov. 2002, 6 pages.

Yeap, T. H. et al., "Novel Conunon Mode Noise Cancellation Techniques for xDSL Applications", Proc. of IEEE Instrumentation and Measurement Technology Conference, Anchorage, AK, May 2002, pp. 1125-1128.

Final Office Action dated May 27, 2010, U.S. Appl. No, 11/067,434, filed Feb. 25, 2005, Sadarat.

Notice of Allowance dated Sep. 15, 2010, U.S. Appl. No. 11/067,434, filed Feb. 25, 2005, Sedarat.

Non-Final Office Action dated Jul. 14, 2010, U.S. Appl. No. 11/131,392, filed May 16, 2005, Wiese.

Notice of Allowance dated Apr. 29, 2010, U.S. Appl. No. 11/348,733, filed Feb. 6, 2006, Norrell et al.

Non-Final Office Action dated Aug. 30, 2010, U.S. Appl. No. 11/377,114, filed Mar. 15, 2006, Sedarat.

Final Office Action dated Jan. 4, 2011, U.S. Appl. No. 11/377,114, filed Mar. 15, 2006, Sedarat.

Non-Final Office Action dated Jul. 26, 2011, U.S. Appl. No, 11/377,114, filed Mar. 15, 2006, Sedarat.

Final Office Action dated Nov. 28, 2011, U.S. Appl. No. 11/377,114, filed Mar. 15, 2006, Sedarat.

Final Office Action dated Jul. 8, 2010, U.S. Appl. No. 11/377,084, filed Mar. 15, 2006, Sedarat et al.

Non-Final Office Action Dated Aug. 16, 2011, U.S. Appl. No. 12/287,577, filed Oct. 10, 2008, Wiese et al.

Notice of Allowance dated Nov. 15, 2011, U.S. Appl. No. 12/287,577, filed Oct. 10, 2008, Wiese et al.

* cited by examiner

VARIOUS METHODS AND APPARATUSES FOR IMPULSE NOISE MITIGATION

RELATED APPLICATIONS

This application claims the benefit of U.S. Provisional Patent Application Ser. No. 60/618,001, filed Oct. 11, 2004, titled "Various Methods and Apparatuses for Impulse Noise Mitigation," which is hereby incorporated by reference in its entirety.

TECHNICAL FIELD

Embodiments of the present invention pertain to the field of communication systems and, more particularly, to impulse noise mitigation in multi-carrier communication systems.

BACKGROUND

A multi-carrier communication system, such as a Discrete Multiple-Tone (DMT) system in the various types of Digital Subscriber Line (e.g., ADSL and VDSL) systems, carries information from a transmitter to a receiver over a number of sub-channels or tones. DMT is a two line-modulation technique used for VDSL. A DMT communication system divides signals into multiple separate channels or tones. Each tone acts as a separate communication channel to carry information between a local transmitter-receiver device and a remote transmitter-receiver device. Each tone is a group of one or more frequencies defined by a center frequency and a set bandwidth.

DMT communication systems use a modulation method in which the available bandwidth of a communication channel, such as twisted-pair copper media, is divided into these numerous tones. The term communication channel is understood to refer generally to a physical transmission medium, including copper, optical fiber, and so forth, as well as other transmission mediums, including radio frequency (RF) and other physical or non-physical communication signal paths.

There are various types of interference and noise sources in a multi-carrier communication system, such as the DMT system. Interference and noise may corrupt the data-bearing signal on a tone as the signal travels through the communication channel and is decoded at the receiver. The transmitted data-bearing signal may further be decoded erroneously by the receiver because of this signal corruption. The number of data bits or the amount of information that a tone carries may vary from tone to tone and depends on the relative power of the data-bearing signal compared to the power of the corrupting signal on that particular tone. Thus, a measure of the quality of signal carried by a tone is the ratio of the received signal strength (power) over the noise strength in the frequency range of operation, or the Signal to Noise Ratio (SNR). High SNR results in high signal quality being carried by a tone. Another measure of signal quality is bit error rate (BER) for a given tone.

In order to account for potential interference on the transmission line and to guarantee a reliable communication between the transmitter and receiver, each tone is typically designed to carry a limited number of data bits per unit time based on the tone's SNR using a bit-loading algorithm. The number of bits that a specific tone may carry decreases as the relative strength of the corrupting signal increases, that is when the SNR is low or the BER is high. Thus, the SNR of a tone may be used to determine how much data should be transmitted by the tone.

It is often assumed that the corrupting signal is an additive random source with Gaussian distribution and white spectrum. With this assumption, the number of data bits that each tone can carry relates directly to the SNR. However, this assumption may not be true in many practical cases and there are various sources of interference that do not have a white, Gaussian distribution. Impulse noise is one such noise source. Bit-loading algorithms, which are methods to determine the number of bits per tone, are usually designed based on the assumption of additive, white, Gaussian noise. With such algorithms, the effects of impulse noise are underestimated resulting in an excessive rate of error.

Further, channel estimation procedures can be designed to optimize performance in the presence of stationary impairments such as additive, white, Gaussian noise, but are often poor at estimating non-stationary or cyclo-stationary impairments, such as impulse noise. Consequently, DSL modem training procedures are typically well suited to optimizing performance in the presence of additive, white, Gaussian noise, but leave the modem receivers relatively defenseless to impulse noise.

Impulse Noise can be a difficult impairment for DSL modems. Impulse noise with duration of tens of microseconds can cause errors in all the used sub-channels at the receiver. Further, because a DMT system programs the impulse noise protection for entire DMT frames, not just for the length of impulse found in the network, latency is introduced in the system.

Typically, impulse noise is mitigated by a combination of two methods: forward error correction (FEC) with interleaving and reducing data rate for increased noise margin. One mitigation strategy compatible with current ADSL2 and VDSL1 procedures is to operate the receiver with sufficient noise margin (including Reed-Solomon coding and interleaving) to maintain the error rate within acceptable limits. Unfortunately, this means that 90-98% of frames are typically running with excess margin to ensure the integrity of data in 2-10% of the frames directly impacted by impulse noise. Further, this method generally does not work for low-latency applications, and it requires a very large interleaver depth, which increases system memory requirements.

SUMMARY

Methods and apparatuses for reducing effects of impulse noise in a DSL transmitter receiver device are described. According to certain embodiment, the method includes using a periodicity associated with the impulse noise affecting a DSL transmitter receiver device to determine data frames that are affected by the impulse noise, and sending a reduced data rate during those frames. In certain embodiments, no data is sent during those frames.

In another embodiment, the method includes using a periodicity associated with the impulse noise affecting a DSL transmitter receiver device to determine data frames that are affected by the impulse noise, and using a high margin bits and gain table, instead of a normal bits and gain table.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DISCUSSION

A process and apparatus to provide impulse noise mitigation and therefore, to improve robustness and performance of telecommunication devices, such as DSL modems, are described. The process involves selectively increasing noise margin on just the frames that are determined to be likely to be harmed by repetitive electric impulse noise (REIN). Accordingly, methods and apparatuses for improving robustness of DSL modems to impulse noise that appears at time intervals that can be predicted reasonably accurately are described.

According to certain embodiments, the impulse noise mitigation scheme involves identifying the periodicity and severity of periodic impulses, and sending low speed data on selective frames that are determined to be likely to be harmed by the impulse noise. A transmitter-receiver device may either lower its data transfer rate or transmit blank frames when the impulse noise is likely to be present.

The data rate may be reduced and operating noise margin increased on a subset of data frames that are predicted as being likely to be impacted by impulse noise. If so, the data rate of the remaining data frames is allowed to operate at the rate determined merely by the average background noise and interference level. Therefore, DSL modems can operate with a low error rate in the presence of impulse noise while operating at a higher data rate relative to a DSL system without impulse noise mitigation, even without an interleaver.

Accordingly, a local/near-end transmitter-receiver device, such as a DSL modem, measures some parameters of the impulse noise, such as the impulse noise frequency and impulse duration, and estimates an expected time in the future when the impulse will corrupt the communication channel. These parameters are communicated to the far-end modem through a reliable logical channel such as the on-line reconfiguration (OLR) channel. The remote/far-end modem uses these parameters to identify the DMT frames that are expected to be corrupted by the impulse noise and uses a secondary low-rate bits and gains table to transmit the data on those frames. This secondary bits and gains table provides adequate margin to prevent errors in the presence of impulse noise. This table is stored at the modems on both ends.

Figure 4:
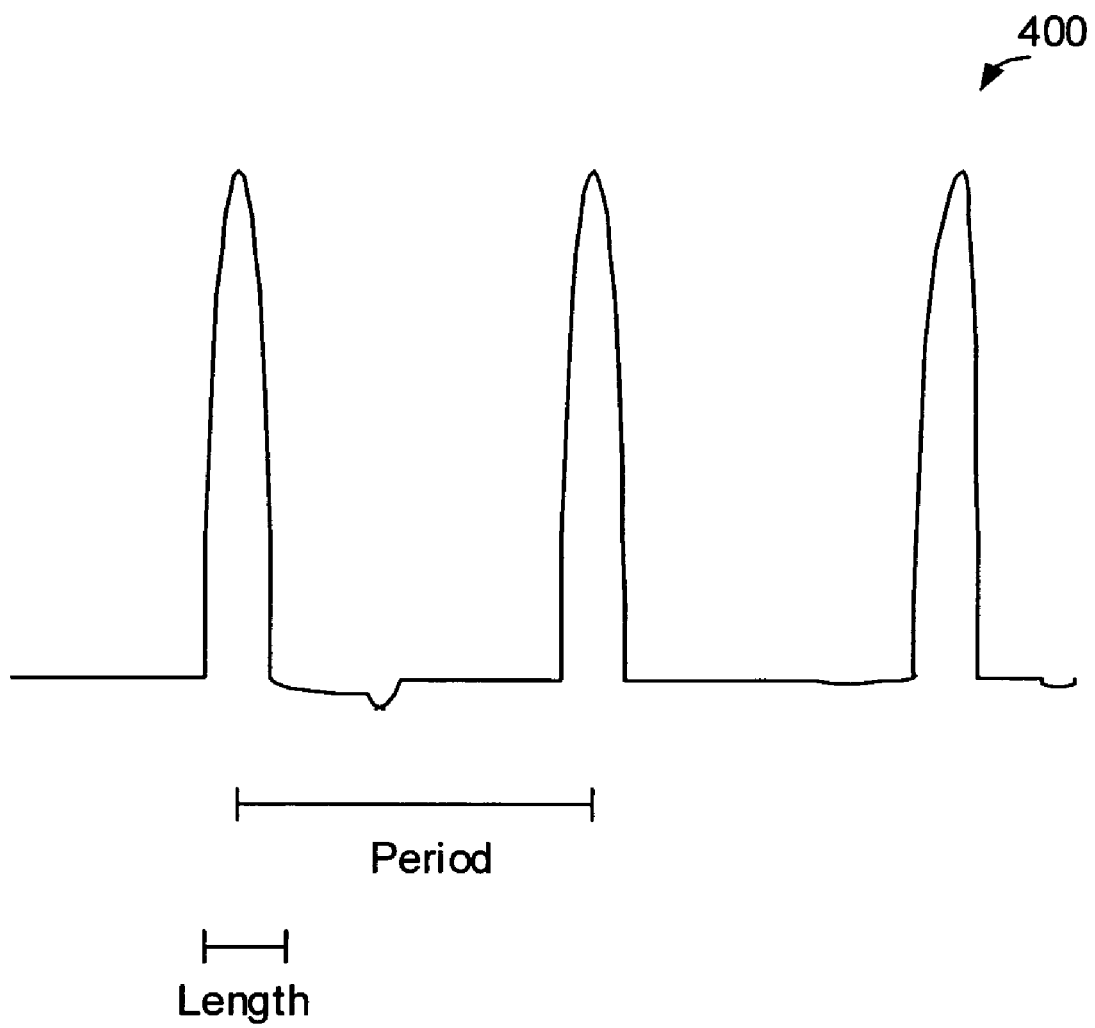
FIG. 4 illustrates a sample repetitive electrical impulse noise.
Figure 5:
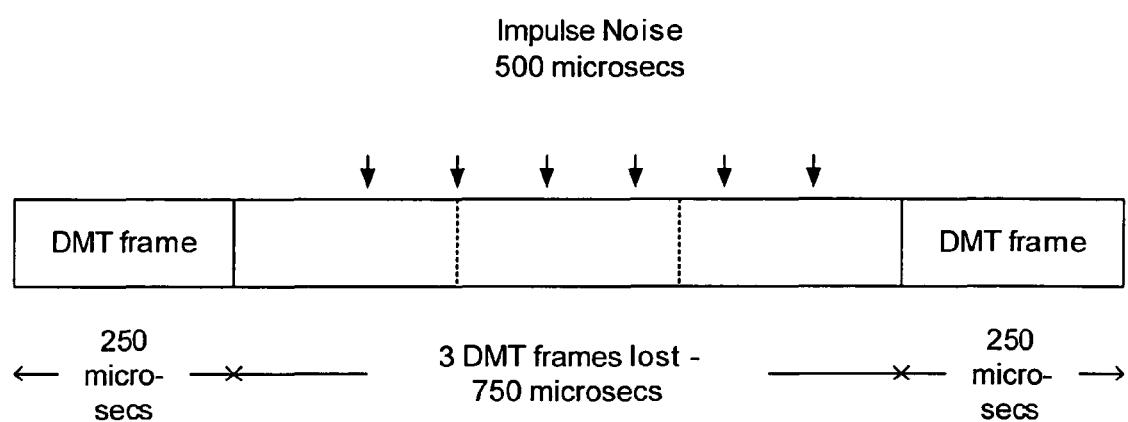
FIG. 5 illustrates a schematic diagram showing the affects of impulse noise on data frames.

The methods and apparatuses discussed herein takes advantage of the often periodic nature of impulse noise. FIG. 4 illustrates an example 400 of an impulse noise duration/length and period P. Some impulse noise, known as "repetitive electrical impulse noise" (REIN) herein, can be considered periodic with a relatively low duty cycle. REIN can be absent during training but appear hours later. A common example of REIN is the impulse noise introduced to a DSL modem when a dimmer switch is used to turn on a light at the CPE location. In this scenario, the dimmer switch generates AC current spikes at 100 or 120 Hz, depending on the national power distribution frequency. These impulses may last for 200-300 µs. For this example, the impulses may occur about every 32-41 DMT frames (when the DMT frame rate is 4000 Hz.), and may generate large bursts of errors in groups of 1-3 frames for each impulse. This means that approximately 2-10% of frames suffer from excessive errors due to periodic impulse noise. As illustrated in FIG. 5, using previous methods a 250 µs long DMT frame dictates impulse noise protection of three DMT frames, or 750 µs, to meet VDSL standards requirement. This introduces extra delay (about 10 ms) and requires extra interleaver memory. Thus, even a short burst of impulse noise may erase all of the information in two DMT frames.

The systems and/or logic described herein may take advantage of the often periodic nature of impulse noise, which is frequently generated at a multiple of the power line frequency by electrical equipment. It has been discovered that the nominal frequency for the impulse noise is around 120 Hz, which corresponds to a REIN period of about 33.8 DMT frames. Measurements further show that consecutive impulses are occasionally detected farther apart. Some examples of sample values for REIN periods with their relative rates are shown below.

| IMPULSE PERIOD (DMT FRAMES) | 33 | 34 | 67 | 68 | 101 |
| --- | --- | --- | --- | --- | --- |
| RATE | 15.00% | 80.22% | 4.74% | 0.04% | 0.01% |

Figure 1:
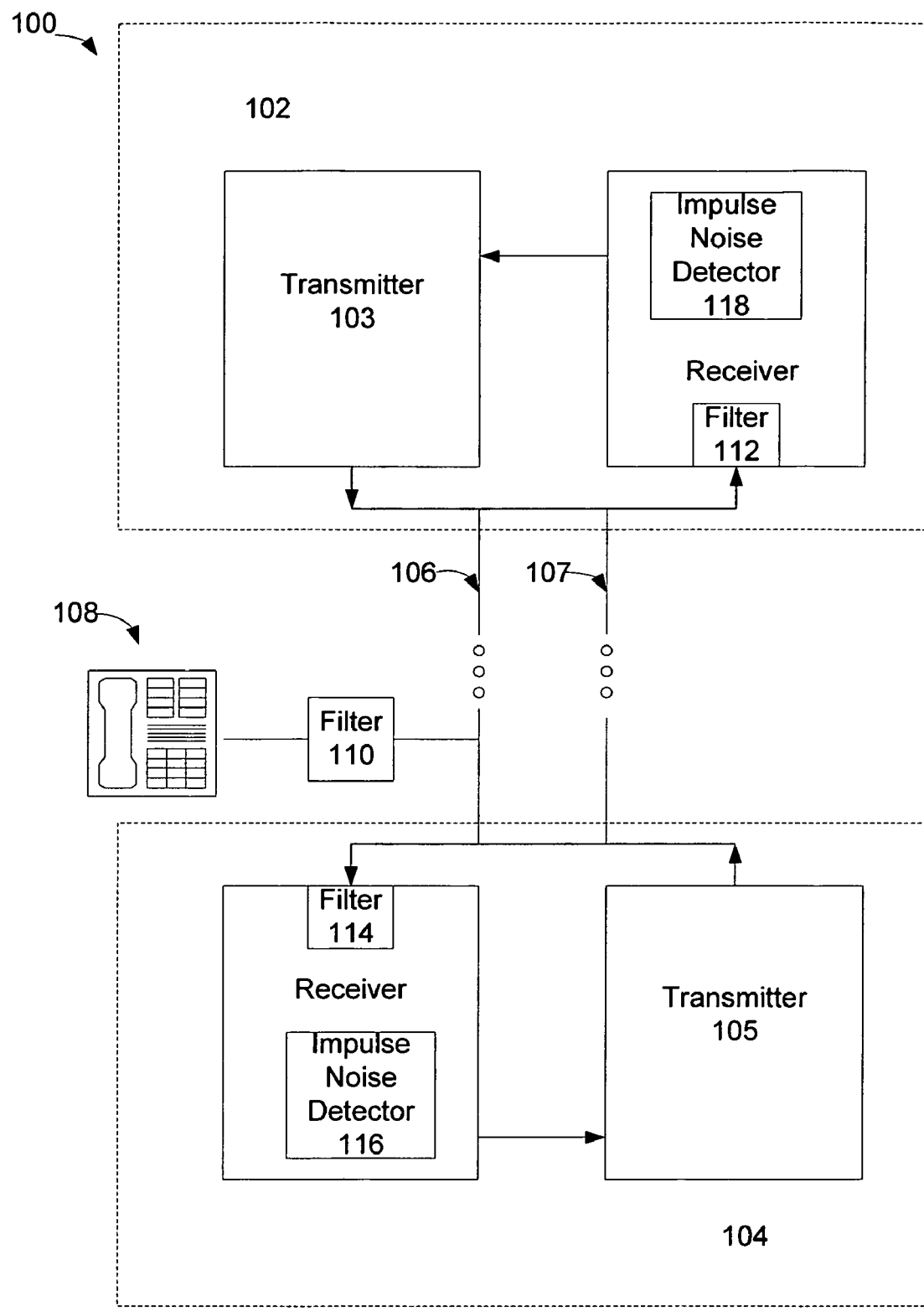
FIG. 1 illustrates a schematic diagram of a DSL environment in which the invention can be implemented.

FIG. 1 illustrates a block diagram of an embodiment of a DMT system that mitigates REIN present on the transmission medium. The DMT system 100, such as a Digital Subscriber Line (DSL) based network, may have two or more transmitter-receiver devices 102, 104, such as a DSL modem in a set top box. The first transmitter-receiver device 102, such as a DMT transmitter, transmits and receives communication signals from the second transmitter-receiver device 104 over a transmission medium 106, such as a telephone line. Other devices such as telephones 108 may also connect to this transmission medium 106. An isolating filter 110 generally exists between the telephone and the transmission medium 106. A training period occurs when initially establishing communications between the first transmitter-receiver device 102 and a second transmitter-receiver device 104.

Also shown in FIG. 1 is the online reconfiguration channel (OLR) 107. The OLR is a reliable channel that is used to autonomously maintain operation within limits set by control parameters and is useful when line or environment conditions are changing. The DMT system 100 may include a central office, multiple distribution points, and multiple end users. The central office may contain the first transmitter-receiver device 102 that communicates with the second transmitter-receiver device 104 at an end user's location.

According to certain embodiments of the invention, the transmitter-receiver device (102 and 104) operates in the presence of severe impulse noise with minimal loss of data as compared to other known schemes for managing and mitigating impulse noise. Each transmitter-receiver device (or in certain embodiments, only one of the transmitter-receiver devices) includes a receiver portion that contains an impulse noise detector 116, 118. Each noise detector 116, 118 contains software and/or logic programmed to detect for the presence of impulse noise present in the system. In certain embodiments, the noise detector detects a duration and frequency of impulse noise. These parameters can be used to determine a time T relative to the beginning of the first frame when the impulse affects the channel (micro seconds), an impulse duration/length L (micro seconds and/or number of frames), and a REIN period P (microseconds).

Rather then reducing performance on all of the modem data frames because periodic impulses are detected, the systems and/or logic described herein merely changes a small percentage (5 to 10 percent) of the data frames to be transmitted at a reduced performance rate. The transmitter-receiver device may reduce the data rate and increase the operating margin on the subset of data frames that are likely to be impacted by impulse noise while allowing the data rate of the remaining data frames to operate at the rate determined by the average background noise and interference level.

Figure 2:
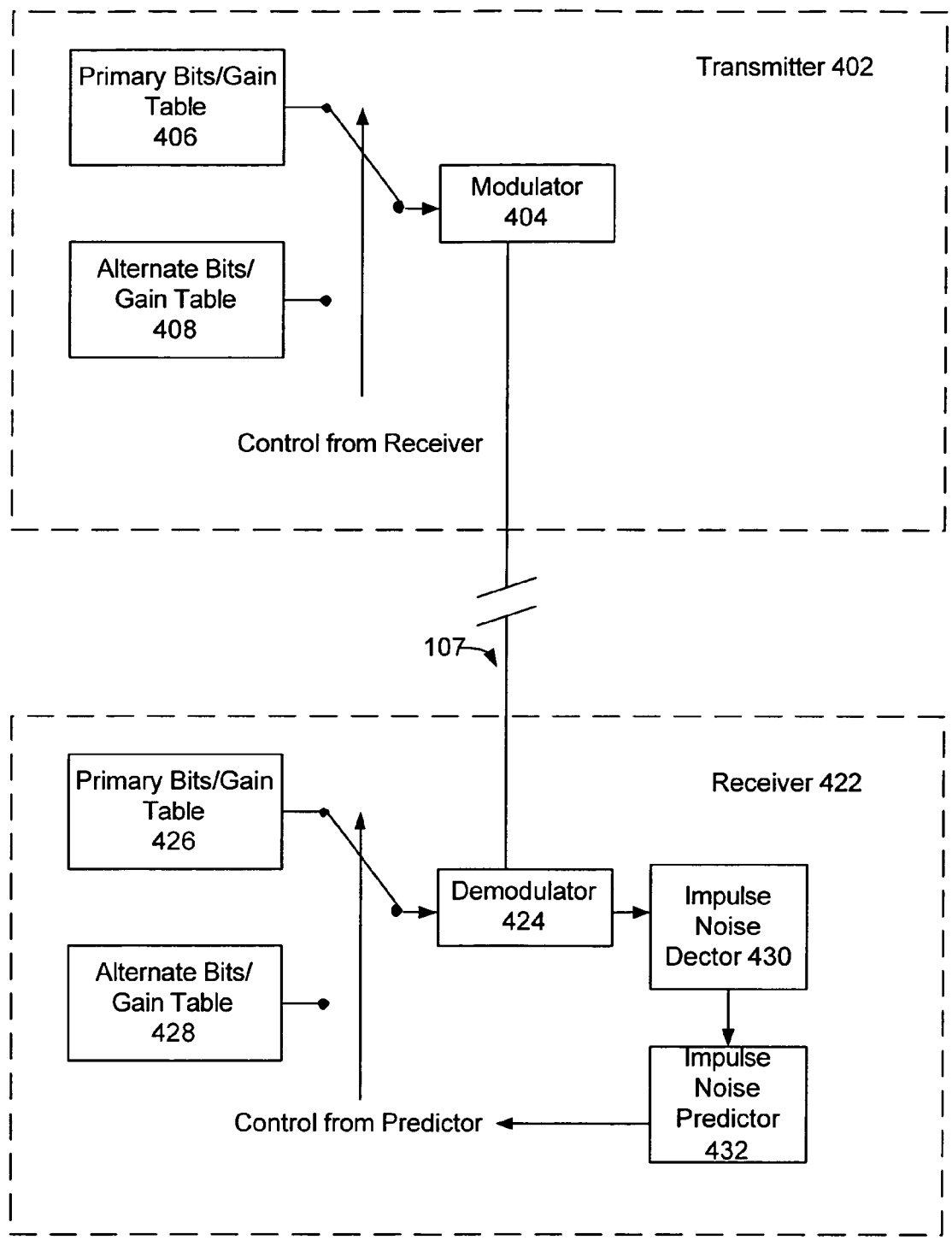
FIG. 2 illustrates a schematic diagram of an embodiment of a DSL modem system having impulse noise mitigation according to certain embodiments of this invention.

FIG. 2 illustrates a schematic diagram of an embodiment of a DSL modem system having impulse noise mitigation according to certain embodiments of this invention. The DSL modem system has a transmitter 402 and a receiver 422. For instance, the transmitter 402 may be a VDSL2 central office transmitter, and the receiver 422 may be a VDSL2 receiver at a customer premises. The transmitter uses a modulator 404 to modulate data frames based on either the primary bits and gain table 406 or one or more alternate bits and gain tables 408. The modulator 404 uses one of the bits and gain tables based on control information received from the receiver 422. The receiver 422 uses a demodulator 424 to demodulate received data frames based on either the primary bits and gain table 426 or one or more alternate bits and gain tables 428. The demodulator 424 uses one of the bits and gain tables based on control information received from an impulse noise predictor 432.

The impulse noise predictor 432 predicts which DMT frames are likely to be corrupted by REIN based on parameters detected by the impulse noise detector 430. The impulse noise detector 430 detects the periodicity and severity of the REIN on data frames demodulated by the demodulator 422. The impulse noise predictor 432 uses the periodicity and severity information to determine when the next impulse noise may affect the DSL system. The impulse noise predictor 432 may calculate such control parameters as a time relative to the beginning of the first frame predicted to be affected by impulse noise, an impulse length, an impulse period and a future frame number to start using the higher margin bits and gain table. The control parameters can be communicated to the transmitter 402 via OLR 107. The OLR 107 also provides a reliable method to synchronize alternate bits and gain tables 408 and 428.

In certain embodiments, to detect the severity and frequency of impulse noise, the impulse noise detector 430 detects an error difference between an amplitude of each transmitted data point in the QAM constellation and an expected amplitude for each data point in the QAM constellation. The impulse noise detector 430 may detect for the presence of impulse noise based on the error difference detected between the received data point and expected data point. The error difference for each transmitted data point may be known as an error sample. The noise detector 430 may determine if the frequency of error samples with the magnitude greater than the threshold is higher than a set point. If the frequency of error samples is higher than the set point then an impulse noise is determined to be present on that particular tone. The designer or user may establish the set point.

The impulse noise detector 430 may count the number of error samples with a magnitude greater than a threshold value that is based upon the standard deviation derived from the Gaussian distribution of impulse noise. Thus, each error sample with either a positive or a negative amplitude having an absolute value greater than the magnitude threshold value is counted. The threshold may be set by the designer or user to be a factor of one or more times the calculated value of the standard deviation.

Figure 3:
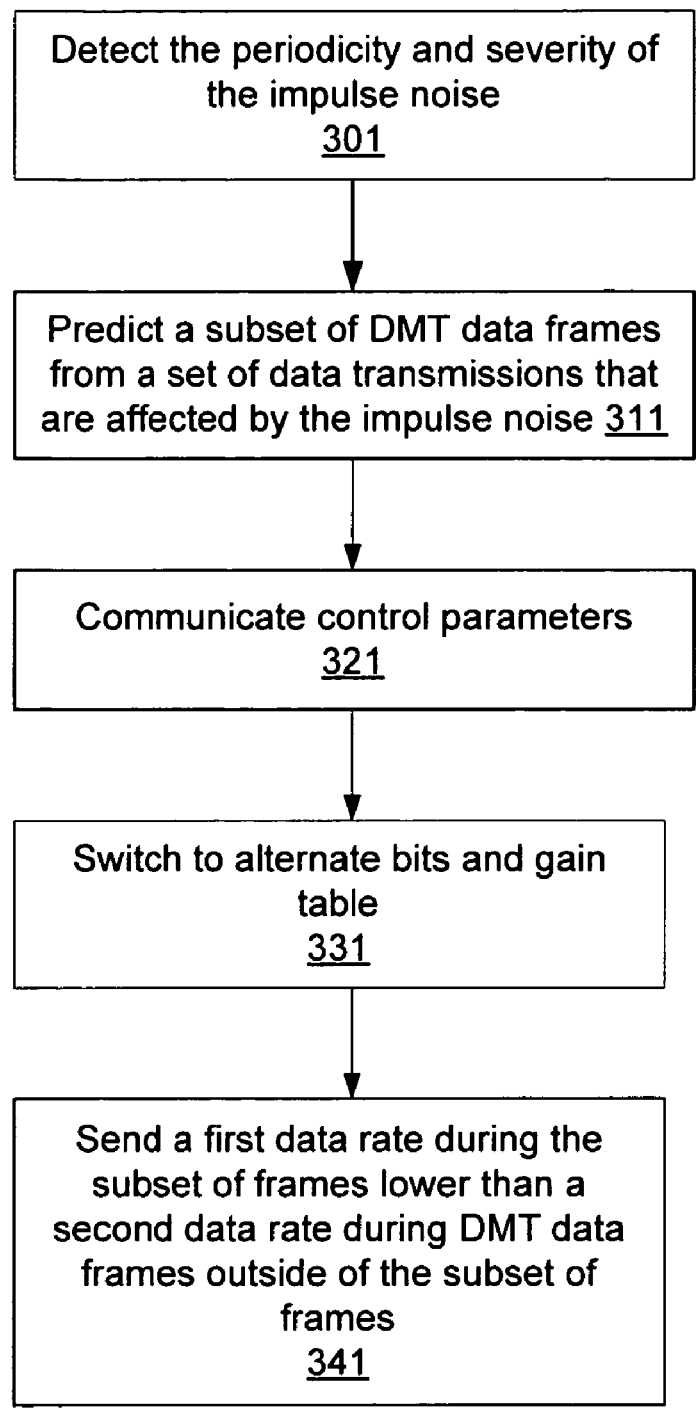
FIG. 3 is a flowchart illustrating an embodiment of a method for impulse noise mitigation, according to certain embodiments of the invention.

FIG. 3 illustrates an embodiment of a method 300 to mitigate impulse noise. At block 301, the periodicity and severity of the periodic impulses is detected. A detector 116 and 118 in both the downstream and upstream receivers can be used to detect the periodicity and severity. According to certain embodiments, the frequency of the impulse noise is detected. A duration that the impulse noise may last may be estimated using previous measurements of impulse noise having the same frequency. Based on this information, the following parameters are calculated from detected information: a time T relative to the beginning of the first frame when the impulse hit the channel (micro seconds), an impulse duration/length L (micro seconds and/or number of frames), and a REIN period P (microseconds).

These parameters are used to predict which frames are likely to be affected by REIN. A future frame number N to start using a high-margin bits and gain table is also calculated. The receiver that suffers the impulse noise learns to predict the timing of the impulses and requests high margin frames from the far transmitter as appropriate to maintain an acceptable error rate. In certain embodiments, the impulse noise mitigation scheme 300 is implemented the same way in both directions of transmission. At block 311, the method 300 predicts a subset of DMT data frames from a set of data transmissions that are affected by the impulse noise.

At block 321, an alternate high margin bits and gain table and control information is sent from the receiver (e.g. receiver of device 104) to the far transmitter (e.g., transmitter of device 102) by extending the capability of the on-line reconfiguration (OLR) mechanism in VDSL2. The following control information could be transmitted at any time: a future frame number N, a duration/length L (number of frames), and a period P (microseconds). N, L, and P can be updated at any time.

At block 331, the other end uses an alternate bits-and-gains table starting from the specified frame number (N) for L frames periodically using the specified period P. The alternate high margin bits and gains table enables data transfer at various levels of noise margin. The use of this table is synchronized between the transmitter and receiver at DMT frame boundaries. A primary bits and gains table, which is typically optimized for maximum bit rate in a stationary noise environment, is used to provide data when there is no impulse noise on the line. 'P=0' indicates a period of infinity; therefore the alternate frame is used just once. 'L=0' and 'P=0' indicates to the far end to discontinue use of the alternate bits-and-gains table. At block 341, a first data rate is used to send the subset of frames predicted to be affected by REIN, the first data rate being lower than a second data rate used to send data during DMT data frames outside of the subset of frames.

The multi-rate impulse mitigation method 300 takes advantage of the repetitive nature of REIN to predict the DMT frames that are corrupted by impulse noise. Thus, on those frames predicted as being corrupted by REIN, data is transmitted using alternate bits and gains tables with lower data rates and higher noise margins to protect against impulse noise and provide error-free data transmission. If no corruption due to REIN is predicted, then the primary bits and gains table is used.

This type of multi-rate impulse protection, however, uses additional memory to store alternate bits and gain tables. In situations, where memory requirements for the alternate bits and gain table prove excessive, frame blanking can be used. Frame blanking eliminates the need for more memory by requiring infinite noise margin in alternate tables, resulting in identical tables with no loaded bits. The corresponding DMT frames are blank frames that carry no information. To maintain stationary transmit power, the gains in alternate tables can be conveniently set to the gains of the primary table. Because all bits in the alternate tables are set to zero and the gains are already stored in the primary gain table, frame blanking does not require additional memory to store alternate tables.

Frame blanking also comes with some overhead cost to system performance. This overhead is due to sending blank frames when impulse noise is on the line. Assuming that the duration of each impulse noise is INP DMT frames, the overhead ($O_{FB}$) of frame blanking can be expressed as:

$$O_{FB} = \frac{INP}{4 \cdot T_{imp}}$$

where $T_{imp}$ is the period of impulse noise, and where INP is the minimum impulse protection capability in terms of number of DMT frames. However, this overhead is still very low compared to the overhead ($O_{RS}$) of Reed-Solomon coding, which can be expressed as:

$$O_{RS} = \frac{INP}{4 \cdot DLY}$$

where INP is the minimum impulse protection capability in terms of number of DMT frames and DLY is the maximum latency associated with interleaving. $O_{RS}$ can match $O_{FB}$ merely when erasure detection and correction is used in the Reed-Solomon decoder, there is no other bound on latency other than the impulse period, and the granularity of codeword size and number of check bytes and other restrictions on the framing parameter do not prevent the minimum of $O_{RS}$ to be achieved.

Further, compared to Reed-Solomon decoding, frame blanking comes with a very small implementation cost. The main requirement on a transmitter that supports frame blanking is the capability of inserting blank DMT frames in to the data stream. The main requirement on the receiver is the capability of discarding the blank frames. Both these capabilities are very similar to the current requirement on VDSL modems. The transmitter and receiver have to insert and discard the blank frames synchronously. However, the transmitter and the receiver can be synchronized using a small set of parameters discussed above (e.g. future frame number N to start using the high margin bits and gain table, time T relative to the beginning of the first frame when the impulse hit the channel, REIN period P, and impulse length L) to reduce the possibility of mismatch. These parameters have to be updated fairly infrequently, indicating a very small increase in the rate of the overhead channel.

Frame blanking requires the detection of impulse noise at the receiver. The complexity of the impulse detector in frame blanking is no higher than the complexity of an erasure detector in Reed-Solomon decoder. Frame blanking also relies on proper estimation of impulse parameters, such as impulse frequency and duration. The processing power needed for this estimation is very low because it can be spread over a long period of time, on the order of several hundreds of DMT frames.

Because there is no interleaver in the frame blanking method, there is no need for extra interleaving memory. Additionally, there is no need to store alternate bits and gains tables, because the blanked-out frames carry no information. Therefore, the memory requirement for frame blanking is virtually zero. Also, because frame blanking does not require an interleaver, there is no latency in the data path.

Frame blanking relieves the Reed-Solomon decoding from having to correct errors caused by periodic impulse noise. The full coding gain of the forward error correction code is then available to protect against Gaussian noise, thus resulting in a higher bit rate. Frame blanking is easily scalable to support possible future requirements for higher INP values. With Reed-Solomon coding, higher INP values can be supported only if extra memory and processing power are available on the system and additional latency is tolerated by the network applications.

In certain embodiments, frame blanking to protect against periodic impulse noise is used in conjunction with Reed-Solomon coding to protect against non-repetitive impulses. In this case, the Reed-Solomon decoder and the interleaver need lower complexity because frame blanking already provides protection against a class of impulse noise that, based on recent service provider inputs to the ITU, is a significant impairment.

Frame blanking relies on accurate prediction of impulse noise. By frequently updating control parameters, the rate of mismatch between predicted frames and real impulsive frames can be very small. However, to further protect against false prediction, a slightly higher INP value can be used. Additionally, or in the alternative, Reed-Solomon coding can be used.

Frame blanking is an effective method to protect DSL modems against periodic impulse noise. It provides impulse protection without additional requirements on memory and latency. Its implementation is much easier than Reed-Solomon coding. It relieves Reed-Solomon from correcting for periodic impulse noise, allowing a larger coding gain with smaller interleaving memory and latency.

As described herein, a DSL modem device has a receiver including an impulse noise predictor to predict if data frames will be affected by impulse noise based upon a periodicity of impulse noise. The DSL modem device also has a demodulator to use a first bits and gain table to provide data when data frames are predicted to be affected by the impulse noise by the impulse noise predictor and a second bits and gain table to provide data if the data frames are not predicted as being affected by the impulse noise by the impulse noise predictor. The impulse noise predictor determines a frame number to start using the first noise margin and a number of frames to continue to use the first noise margin. The impulse noise detector may detect the impulse noise periodicity as well as a duration of the impulse noise to predict when a next occurrence of impulse noise will occur.

An impulse noise mitigation method uses a periodicity associated with impulse noise to predict a subset of DMT data frames from a set of data transmissions that are affected by the impulse noise, and sends a first data rate during the subset of frames lower than a second data rate during DMT data frames outside of the subset of frames.

The embodiments described require a robust communication and control scheme that each receiver uses to request high margin frames when needed. The capability of the OLR mechanism in VDSL2 must be extended to communicate certain information reliably. Other new features must also be added to the VDSL2 standard. For instance, in certain embodiments, two frame counters are used to keep track of frames. Both transmitter-receiver devices (near-end and far-end) must keep track of both frame counters. These counters are initialized to 0 at the start of showtime, and incremented for each frame. The counters may be reduced Modulo $2^k$ to confine the counter to k bits. Also, an alternate high margin bits and gain table must reside in both receivers and transmitters in addition to the normal bits and gain table. Further, an impulse noise detector must be added to at least one receiver.

A periodic impulse noise mitigation scheme may be implemented. Since impulse noise tends to have a fairly small duty cycle, this impulse noise mitigation scheme enables the modem receiver at either end to operate at AWGN bounds when impulses are absent, while operating with sufficient margin to withstand impulses only when they are likely to be present. This method will work with or without interleaving. This impulse noise mitigation scheme uses an impulse detector in the receiver, an alternate bit/gain table for both directions of transmission, and a robust communication/control scheme to control the use of the alternate bit/gain tables.

The detailed description above includes several modules. These modules may be implemented by hardware components, such as logic, or may be embodied in machine-executable instructions, which may be used to cause a general-purpose or special-purpose processor programmed with the instructions to perform the operations described herein. Alternatively, the operations may be performed by a combination of hardware and software. In one embodiment, the software used to facilitate the impulse noise mitigation can be embodied onto a machine-readable storage medium. A machine-readable storage medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein.

Thus, a method and apparatus for mitigating impulse noise have been described. The detection and mitigation of the impulse noise may use various features of the ADSL, ADSL2, and VDSL specifications. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A digital subscriber line (DSL) modem receiver, comprising:
    an impulse noise predictor configured to predict whether a data frame from among a plurality of data frames will be affected by impulse noise and to identify a number of subsequent frames from among the plurality of data frames that will be affected by the impulse noise based upon a periodicity of the impulse noise; and
    a demodulator configured to demodulate the plurality of data frames using parameters from at least one of a first table and a second table, the parameters from the first table being used for the data frame and the subsequent frames that are predicted to be affected by the impulse noise, and the parameters from the second table being used when the data frame is not predicted to be affected by the impulse noise,
    wherein the impulse noise predictor is further configured to determine a plurality of frame numbers corresponding to the data frame and the subsequent frames and to determine a number of frames at which the demodulator is to use the first table.

2. The DSL modem receiver of claim 1, wherein the first table comprises:
    a first bits and gain table characterized as having a first noise margin high enough to protect against the impulse noise.

3. The DSL modem receiver of claim 2, wherein the second table is comprises:
    a second bits and gain table characterized as having a second noise margin lower than the first noise margin.

4. The DSL modem receiver of claim 3, wherein the first bits and gain table is characterized as having a lower data rate than the second bits and gain table.

5. The DSL modem receiver of claim 4, wherein the first bits and gain table has a data rate of approximately zero.

6. The DSL modem receiver of claim 1, wherein the impulse noise predictor is configured to detect the periodicity of the impulse noise and a duration of the impulse noise to predict when a next occurrence of the impulse noise will occur.

7. A digital subscriber line (DSL) modem receiver, comprising:
    an impulse noise predictor configured to predict if data frames will be affected by impulse noise based upon a periodicity of the impulse noise; and
    a demodulator configured to use a first table to provide data when the data frames are predicted to be affected by the impulse noise and a second table to provide the data when the data frames are not predicted as being affected by the impulse noise,
    wherein the first table is a first bits and gain table characterized as having a first noise margin high enough to protect against the impulse noise, and
    wherein the impulse noise predictor is further configured to determine a frame number to start using the first noise margin and a number of frames to use the first noise margin.

8. A method for impulse noise mitigation, comprising:
    predicting a subset of Discrete Multiple-Tone (DMT) data frames from among a set of DMT data frames that will be affected by impulse noise using a periodicity associated with the impulse noise, the subset of DMT data frames including a data frame from among the DMT data frames that will be affected by impulse noise and a number of subsequent frames from among the DMT data frames that will be affected by the impulse noise;
    determining a plurality of frame numbers, corresponding to the data frame and the subsequent frames, at which a first data rate is to be sent and a number of frames to continue to send the first data rate; and sending the first data rate during the subset of DMT data frames, the first data rate being lower than a second data rate to be sent during DMT data frames outside of the subset of DMT data frames.

9. The method of claim 8, further comprising:
increasing an operating noise margin on the subset of DMT data frames as compared to the DMT data frames outside of the subset of DMT data frames.

10. The method of claim 8, further comprising:
sending blank data frames during the subset of the DMT frames.

11. The method of claim 8, further comprising:
using Reed-Solomon coding when a repeatable periodicity cannot be established for the impulse noise.

12. A method for impulse noise mitigation, comprising:
predicting a subset of Discrete Multiple-Tone (DMT) data frames from among a set of DMT data frames that will be affected by impulse noise using a periodicity associated with the impulse noise;

sending a first data rate during the subset of DMT frames, the first data rate being lower than a second data rate to be sent during DMT data frames outside of the subset of DMT data frames;

increasing an operating noise margin on the subset of DMT data frames as compared to an operating noise margin on the DMT data frames outside of the subset of the DMT frames; and using a first bits and gain table, the first bits and gain table being characterized as having a first noise margin high enough to protect against the impulse noise, to send the first data rate during the subset of the DMT frames.

13. The method of claim 12, further comprising:
switching to a second bits and gain table, the second bits and gain table being characterized as having a lower noise margin than the first noise margin when the impulse noise is predicted to subside.

14. A DSL system, comprising:
a first transmitter-receiver device having a receiver, the receiver including:
an impulse noise predictor configured to determine whether a data frame from among a plurality of data frames will be affected by impulse noise and to identify a number of subsequent frames from among a plurality of data frames that will be affected by the impulse noise based upon an impulse noise periodicity to provide control parameters, the control parameters including a plurality of frame numbers corresponding to the data frame and the subsequent frames and a number of frames corresponding to a duration of the impulse noise; and a second transmitter-receiver device having a transmitter, the transmitter being configured to reduce its transmission data rate from a first data rate to a second data rate starting at each of the plurality of frame numbers for a duration of the number of frames upon receiving the control parameters, the second data rate being lower than the first data rate which is to be sent during other data frames from among the plurality of data frames that have frame numbers not specified by the control parameters.

15. The DSL system of claim 14, wherein the second transmitter-receiver device is configured to reduce its transmission data rate using a bits and gain table to carry data, the bits and gain table being characterized as having a noise margin set to protect the data against the impulse noise.

16. The DSL system of claim 15, wherein the first transmitter-receiver device further comprises:
a second transmitter configured to communicate the control parameters and the bits and gain table over an enhanced online reconfiguration (OLR) channel to the second transmitter-receiver device.

17. The DSL system of claim 16, wherein the enhanced OLR channel is used to synchronize the bits and gain table between the first and second transmitter-receiver devices.

18. The DSL system of claim 15, wherein the control parameters further comprise at least one of a group consisting of:
(1) time relative to a beginning of a first frame predicted to be affected by the impulse noise,
(2) an impulse duration,
(3) an impulse frequency, and
(4) the frame number to start using the bits and gain table.

19. The DSL system of claim 14, wherein the receiver of the first transmitter-receiver device further comprises:
an impulse noise detector configured to detect presence of the impulse noise in the DSL system.

20. An apparatus, comprising:
means for predicting a subset of Discrete Multiple-Tone (DMT) data frames from a set of DMT data frames that will be affected by impulse noise using a periodicity associated with the impulse noise, the subset of DMT data frames including a data frame from among the subset of DMT data frames that will be affected by the impulse noise and a number of subsequent frames from among the DMT data frames that will be affected by the impulse noise;

means for determining a plurality of frame numbers corresponding to the subset of the DMT frames at which a first data rate is to be sent and a number of frames to continue to send the first data rate; and means for sending the first data rate starting at each of the plurality of frame numbers for a duration of the impulse noise during the subset of the DMT frames, the first data rate being lower than a second data rate to be sent during DMT data frames outside of the subset of the DMT frames.

* * * * *

UNITED STATES PATENT AND TRADEMARK OFFICE
CERTIFICATE OF CORRECTION

PATENT NO. : 8,194,722 B2
APPLICATION NO. : 11/248704
DATED : June 5, 2012
INVENTOR(S) : Norrell et al.

Page 1 of 1

It is certified that error appears in the above-identified patent and that said Letters Patent is hereby corrected as shown below:

On the Title Page
Item [57], Abstract, please replace "embodiment" with --embodiments--.

In the Claims

Column 10
Line 27, Claim 3, please replace "is comprises" with --comprises--.

Signed and Sealed this
Twenty-third Day of July, 2013

Teresa Stanek Rea
*Acting Director of the United States Patent and Trademark Office*